(12) United States Patent
Noh et al.

(10) Patent No.: US 11,340,959 B2
(45) Date of Patent: May 24, 2022

(54) ELECTRONIC APPARATUS FOR RUNNING APPLICATION AND CONTROL METHOD THEREOF

(71) Applicant: LG ELECTRONICS INC., Seoul (KR)

(72) Inventors: Kensin Noh, Seoul (KR); Dongwan Kang, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 16/727,828

(22) Filed: Dec. 26, 2019

(65) Prior Publication Data
US 2021/0124625 A1 Apr. 29, 2021

(51) Int. Cl.
*G06F 9/50* (2006.01)
*G06F 9/48* (2006.01)
(Continued)

(52) U.S. Cl.
CPC ............ *G06F 9/5094* (2013.01); *G06F 3/00* (2013.01); *G06F 3/048* (2013.01); *G06F 3/0481* (2013.01); *G06F 9/48* (2013.01); *G06F 9/485* (2013.01); *G06F 9/4843* (2013.01); *G06F 9/50* (2013.01); *G06F 9/5005* (2013.01); *G06F 9/5022* (2013.01); *G06F 9/5027* (2013.01); *G06F 9/5083* (2013.01); *G09G 5/10* (2013.01); *G09G 2320/0686* (2013.01)

(58) Field of Classification Search
CPC .......... G06F 3/00; G06F 3/048; G06F 3/0481; G06F 2203/04804; G06F 9/48; G06F 9/4843; G06F 9/485; G06F 9/50; G06F 9/5005; G06F 9/5022; G06F 9/5027; G06F 9/5083; G06F 9/5094; H04N 1/00501; G09G 5/10; G09G 2320/0686
See application file for complete search history.

(56) References Cited

U.S. PATENT DOCUMENTS 9,122,518 B2 * 9/2015 Choi ...................... G06F 3/048
9,513,696 B2 12/2016 Banerjee et al.
(Continued)

FOREIGN PATENT DOCUMENTS

JP 2005174201 6/2005
KR 1020040051580 6/2004
KR 102006419 8/2019

OTHER PUBLICATIONS

PCT International Application No. PCT/KR2019/014359, International Search Report dated Jul. 20, 2020, 4 pages.
(Continued)

*Primary Examiner* — Charles M Swift
(74) *Attorney, Agent, or Firm* — Lee Hong Degerman Kang Waimey

(57) ABSTRACT

Provided is a control method of an electronic apparatus, the method including displaying content corresponding to a first application in a first area of a display, displaying content corresponding to a second application in a second area of the display, identifying resource allocation information associated with the first application and the second application, and running the first application and the second application based on the identified resource allocation information.

13 Claims, 17 Drawing Sheets

(51) Int. Cl.
*G09G 5/10* (2006.01)
*G06F 3/048* (2013.01)
*G06F 3/0481* (2022.01)
*G06F 3/00* (2006.01)

(56) References Cited

U.S. PATENT DOCUMENTS

| | | | | |
|---|---|---|---|---|
| 2003/0119562 A1* | 6/2003 | Kokubo | ............ | H04M 1/72403 455/566 |
| 2004/0183765 A1* | 9/2004 | Morisawa | ............ | G09G 3/3611 345/89 |
| 2010/0023940 A1* | 1/2010 | Iwamatsu | ............. | G06F 9/5077 718/1 |
| 2010/0131957 A1 | 5/2010 | Kami | | |
| 2014/0089833 A1* | 3/2014 | Hwang | ................ | G06F 3/0486 715/769 |
| 2015/0067585 A1* | 3/2015 | Won | .................... | G06F 3/04817 715/784 |
| 2015/0286344 A1* | 10/2015 | Kaufthal | ............... | G06F 3/0481 715/768 |
| 2015/0324095 A1* | 11/2015 | Brown | ................ | G06F 3/04845 715/799 |
| 2016/0132992 A1* | 5/2016 | Rodrig | ..................... | G06F 8/38 715/746 |
| 2017/0345399 A1 | 11/2017 | Lee et al. | | |
| 2018/0046510 A1* | 2/2018 | Boss | ................... | G06F 11/3024 |
| 2019/0158417 A1* | 5/2019 | Aronovich | .......... | H04L 41/0896 |
| 2019/0278336 A1* | 9/2019 | Choi | ................... | G06F 9/4843 |

OTHER PUBLICATIONS

Intellectual Property Office of India Application Serial No. 202034000340, Office Action dated Jul. 5, 2021, 9 pages.

* cited by examiner (a)  (b)

FIG. 9

| First category | Second category |
|---|---|
| 1) FPS<br>   40<br><br>2) brightness<br>   30%<br><br>3) Core distribution<br>   CPU 0, 4<br>   GPU 20%<br><br>4) Core time<br>   CPU 300ms<br>   GPU 300ms | 1) FPS<br>   10<br><br>2) brightness<br>   20%<br><br>3) Core distribution<br>   CPU 5, 6, 7<br>   GPU 60%<br><br>4) Core time<br>   CPU 500ms<br>   GPU 500ms |
|  | Third category<br>1) FPS<br>   20<br><br>2) brightness<br>   10%<br><br>3) Core distribution<br>   CPU 3<br>   GPU 10%<br><br>4) Core time<br>   CPU 100ms<br>   GPU 100ms |

FIG. 11

| A | | B | |
|---|---|---|---|
| - No brightness control | | - No brightness control | |
| - No FPS control | | - No FPS control | |
| - No image quality control | | - No image quality control | |
| - No resolution control | | - No resolution control | |
| C | | | |
| - Brightness 'stage 1' | | | |
| - FPS 'stage 1' | | | |
| - Image quality 'stage 1' | | | |
| - Resolution 'stage 1' | | | |

(a)

| A | | B | |
|---|---|---|---|
| - Brightness 'stage 1' | | - Brightness 'stage 1' | |
| - FPS 'stage 1' | | - FPS 'stage 1' | |
| - Image quality 'stage 1' | | - Image quality 'stage 1' | |
| - Resolution 'stage 1' | | - Resolution 'stage 1' | |
| | | C | |
| | | - Brightness 'stage 2' | |
| | | - FPS 'stage 2' | |
| | | - Image quality 'stage 2' | |
| | | - Resolution 'stage 2' | |

(b)

ELECTRONIC APPARATUS FOR RUNNING APPLICATION AND CONTROL METHOD THEREOF

CROSS-REFERENCE TO RELATED APPLICATION

Pursuant to 35 U.S.C. § 119(a), this application claims the benefit of earlier filing date and right of priority to International Application No. PCT/KR2019/014359, filed on Oct. 29, 2019, the contents of which are hereby incorporated by reference herein its entirety.

BACKGROUND

1. Field

This disclosure relates to an electronic apparatus for running a plurality of applications and a control method thereof.

2. Description of the Related Art

Advances of network technologies and expansions of infrastructures have enabled an electronic device with a display to perform various and professional tasks. Accordingly, there has been an increasing desire for a display that displays content on a large screen.

To meet a user's desire for simultaneously using various functions, an electronic device with a display having a large screen may provide a function to run a plurality of applications on one display.

In this case, resources of the electronic device (e.g., a central processing unit (CPU)) may be competitively used to run the plurality of applications. For example, the plurality of applications may compete for resource acquisition at intervals of a reference time or clock (e.g., 0.1 seconds). In this example, the resources of the electronic device may be used to run an application that wins the competition such that the plurality of applications is run simultaneously.

In this case, however, characteristics of each of the plurality of applications may not be reflected, which may reduce an efficiency in resource utilization. As a result, a running speed of the electronic device may be reduced and a user experience may be degraded.

Accordingly, there is a desire for a method of running a plurality of applications with increased efficiency.

SUMMARY

An aspect provides an electronic apparatus running a plurality of applications by allocating resources based on resource allocation information for each of the plurality of applications, and a control method thereof.

Technical goals of the present disclosure are not limited as mentioned above and, although not mentioned, may include goals that can be clearly understood by those skilled in the art to which the present disclosure pertains, from the following description.

According to an aspect, there is provided an electronic apparatus including a display and a controller. The controller is configured to display content corresponding to a first application in a first area of the display and display content corresponding to a second application in a second area of the display. The content displayed in the first area and the second area is displayed based on setting information.

According to another aspect, there is also provided an electronic device including a display and a controller. The controller is configured to display content corresponding to a first application in a first area of the display, display content corresponding to a second application in a second area of the display, identify resource allocation information associated with the first application and the second application, and run the first application and the second application based on the identified resource allocation information.

According to another aspect, there is also provided a control method of an electronic apparatus, the method including displaying content corresponding to a first application in a first area of a display, displaying content corresponding to a second application in a second area of the display, identifying resource allocation information associated with the first application and the second application, and running the first application and the second application based on the identified resource allocation information.

BRIEF DESCRIPTION OF THE DRAWINGS

The above and other aspects, features, and advantages of certain embodiments will be more apparent from the following detailed description taken in conjunction with the accompanying drawings, in which:

FIG. 9 is a diagram illustrating an example of determining resource allocation information for each category of a plurality of applications in an electronic apparatus according to an example embodiment of the present disclosure;

FIG. 11 illustrates examples of applying an input to at least two of a plurality of applications in an electronic apparatus according to an example embodiment of the present disclosure;

DETAILED DESCRIPTION

Figure 1:
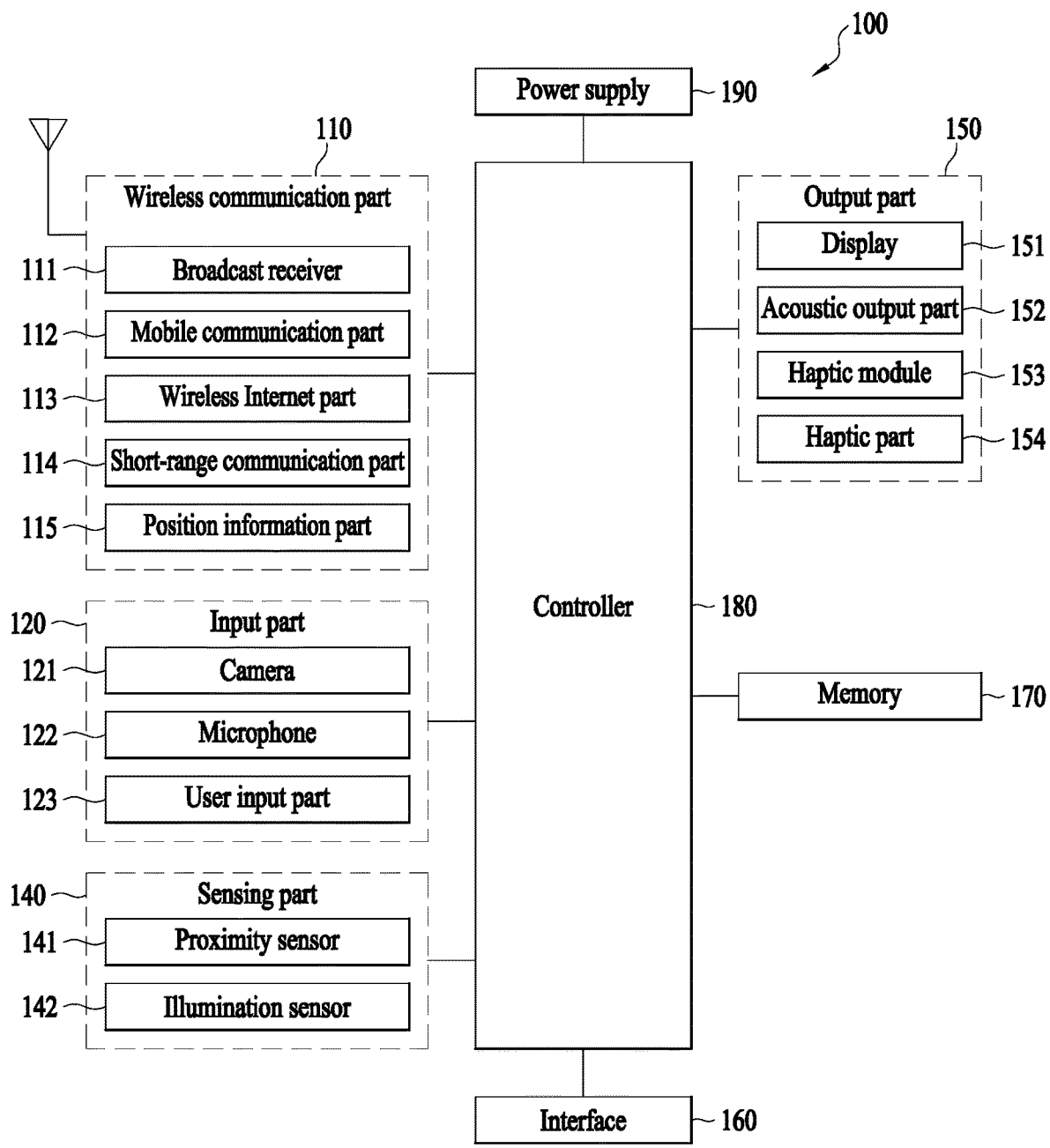
FIG. 1 is a block diagram illustrating an electronic apparatus related to an example embodiment of the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure.

An electronic apparatus 100 may include a wireless communicator 110, an input part 120, a sensing part 140, an outer part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communicator 110 may include at least one module that enables wireless communication to be performed between the electronic apparatus 100 and a wireless communication system, between the electronic apparatus 100 and another electronic apparatus 100, or between the electronic apparatus 100 and an external server. The wireless communicator 110 may include one or more modules that connect the electronic apparatus 100 to one or more networks.

The wireless communicator 110 may include at least one of a broadcast receiving module 111, a mobile communication module 112, a wireless Internet module 113, a short-range communication module 114, and a position information module 115.

Referring to the wireless communicator 110, the broadcast receiving module 111 of the wireless communicator 110 may receive a broadcast signal and/or broadcast related information from an external broadcast management server through a broadcast channel. The broadcast channel may include a satellite channel and a terrestrial channel. Two or more broadcast receiving modules may be provided to the mobile terminal 100 for simultaneous broadcast reception or broadcast channel switching for at least two broadcast channels.

The mobile communication module 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal may include various types of data based on transmission and reception of a voice call signal, a video call signal, or a text/multimedia message.

The wireless Internet module 113 may refer to a module for wireless Internet access, and may be embedded or disposed external to the electronic apparatus 100. The wireless Internet module 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet module 113 that performs the wireless Internet access through the mobile communication network may be understood as a kind of the mobile communication module 112.

The short-range communication module 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication module 114 may use wireless area networks to support wireless communication between the electronic apparatus 100 and a wireless communication system, wireless communication between the electronic apparatus 100 and another electronic apparatus 100, or wireless communication between the electronic apparatus 100 and a network in which another mobile terminal (100 or external server). The wireless range networks may be wireless personal area networks.

The position information module 115 may be a module that acquires a position (or current position) of a mobile terminal. A representative example of the position information module 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the position information module 115 may perform a certain function of other modules of the wireless communicator 110 to acquire data on the position of the mobile terminal, additionally or in substitution. The position information module 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The camera 121 may process an image frame such as a stationary image or a moving image acquired by an image sensor in a video call mode or a capturing mode. The processed image frame may be displayed on the display 151 or stored in the memory 170. For example, the electronic apparatus 100 may include a plurality of cameras 121. In this example, the cameras 121 may be arranged in a matrix structure. Through the cameras 121 arranged in the matrix structure, a plurality of pieces of image information having various angles and focal points may be input to the electronic apparatus 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the electronic apparatus 100. In the microphone 122, various noise removal algorithms may be implemented to remove noise generated in a process of receiving external acoustic signals.

The user input part 123 may be to receive information from a user. When the information is input through the user input part 123, the controller 180 may control an operation of the electronic apparatus 100 based on the input information. The user input part 123 may include a mechanical input means (or a mechanical key, for example, a button a dome switch, a jog wheel, and a jog switch on a front, rear, or side surface of the electronic apparatus 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic module 153, and an optical output part 154. The display 151 may form a layer structure or an integrated structure with a touch sensor to implement a touch screen. The touch screen may function as the user input part 123 that provides an input interface between the electronic apparatus 100 and a user and simultaneously, provide an output interface between the electronic apparatus 100 and the user.

The acoustic output part 152 may output audio data stored in the memory 170 or received from the wireless communicator 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the electronic apparatus 100. For example, the acoustic output part 152 may include at least one of a receiver, a speaker, or a buzzer.

The haptic module 153 may generate various tactile effects to be experienced by a user. A vibration may be a representative example of the tactile effects generated by the haptic module 153. An intensity and a pattern of the vibration generated by the haptic module 153 may be determined based on a selection of a user or setting of the controller 180. For example, the haptic module 153 may output a combination of different vibrations or output different vibrations in sequence.

The optical output part 154 may output a signal to announce an event occurrence using light of a light source of the electronic apparatus 100. An event occurring in the electronic apparatus 100 may be, for example, message reception, a call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform an appropriate control associated with the connected external device.

The memory 170 may store data supporting various functions of the electronic apparatus 100. The memory 170 may store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program may be stored in the memory 170, installed in the electronic apparatus 100, and run by the controller 180 to perform an operation (or function) of the mobile terminal.

The controller 180 may generally control an overall operation of the electronic apparatus 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic apparatus 100.

The power supply 190 may supply power to each component included in the electronic apparatus 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

The electronic apparatus 100 may be in a bar shape but not limited thereto. The electronic apparatus 100 may have various shapes within the scope of not contradicting features of the present disclosure.

In the present disclosure, the electronic apparatus 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic apparatus 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic apparatus 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.

Figure 2:
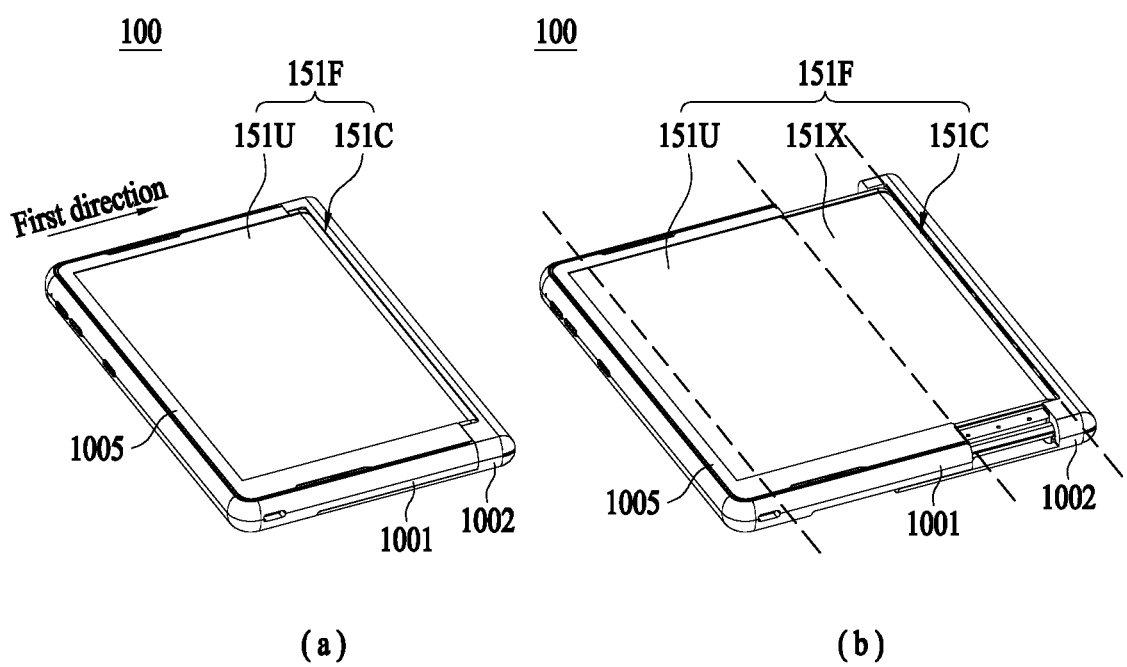
FIG. 2 illustrates front perspective views obtained before and after an expansion of a display of an electronic apparatus according to an example embodiment of the present disclosure.
Figure 3:
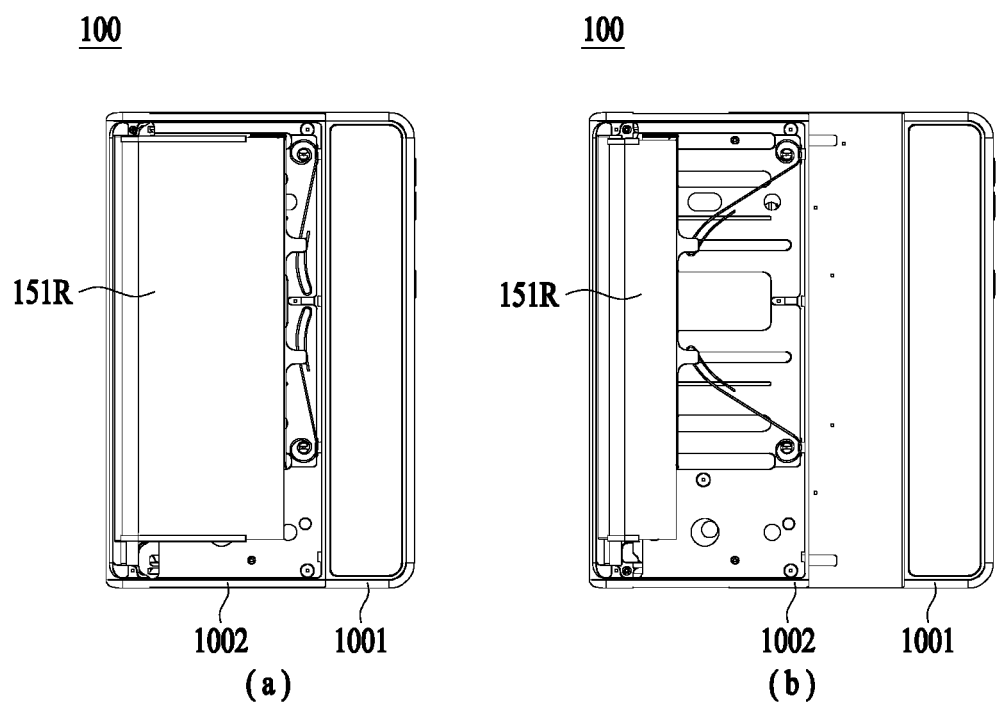
FIG. 3 illustrates rear views obtained before and after an expansion of a display of an electronic apparatus according to an example embodiment of the present disclosure.

FIG. 2 illustrates front perspective views obtained before and after an expansion of a display of an electronic apparatus according to an example embodiment of the present disclosure, and FIG. 3 illustrates rear views thereof.

The display 151 may have one side fixed at a front surface area based on the electronic apparatus 100. The display 151 wound at a first directional edge, so as to be provided over a rear surface. A front surface area 151F of the display 151 may be expandable. In this example, a rear surface area 151R of the display 151 may be reduced. Conversely, when the front surface area 151F of the display 151 is reduced, the rear surface area 151R of the display 151 may be expanded.

A direction in which the front surface area 151F of the display 151 is expanded may be defined as a first direction. In this case, as the front surface area 151F is expanded, a winding area 151C of the display 151 may move in the first direction. Also, as the front surface area 151F of the display 151 is reduced, the winding area 151C of the display 151 may move in a direction opposite to the first direction.

To guide and support the expanded and reduced display 151, a frame supporting the display 151 may also be expanded and reduced correspondingly. The frame may include a first frame 1001 and a second frame 1002 that slidably moves in the first direction relative to the first frame 1001.

In the front surface area 151F of the display 151, an area constantly maintained irrespective of an expansion and a reduction may be defined as a fixed area 151U. Also, an area selectively exposed on the front surface in accordance with the expansion and the reduction may be defined as a variable area 151X. Based on a state in which the front surface area 151F of the display 151 is expanded, the fixed area 151U of the display 151 may be located in the first frame 1001 and the variable area 151X of the display 151 may be located in the second frame 1002.

When the second frame 1002 slides in the first direction and extends from the first frame 1001, the front surface area 151F of the display 151 may be expanded, so that the fixed area 151U and the variable area 151X are exposed on the front surface. When the second frame 1002 slides in the direction opposite to the first direction and contracted from the first frame 1001, the front surface area 151F of the display 151 may be reduced, so that only the fixed area 151U remains.

The rear surface area 151R of the display 151 may be exposed on a rear surface of the second frame 1002. The display rear surface area 151R may be covered by a light-transmitting rear window to be viewable externally.

The display front surface area 151F may be exposed on the front surface without using a separate window. A deco frame 1005 may cover a boundary area of the display front surface area 151F and the first frame 1001 to prevent an inflow of foreign material and cover a bezel area of the electronic apparatus 100 to improve a user's screen visibility.

An electronic device part may be formed in an inner space formed by an appearance structure such as the first frame 1001 and the second frame 1002. Electronic components such as a battery 191 for driving the electronic apparatus 100 may be mounted on a main-PCB so as to be included in the electronic device part. An electronic component such as an inner antenna module may be provided directly in the electronic device part not through the main-PCB.

In the example embodiment, the electronic apparatus 100 may include a motor (or driver) to expand the display 151. The electronic apparatus 100 may adjust a moving direction of a winding area 151C of the display 151 using the motor, thereby changing a size of the display 151.

Figure 4:
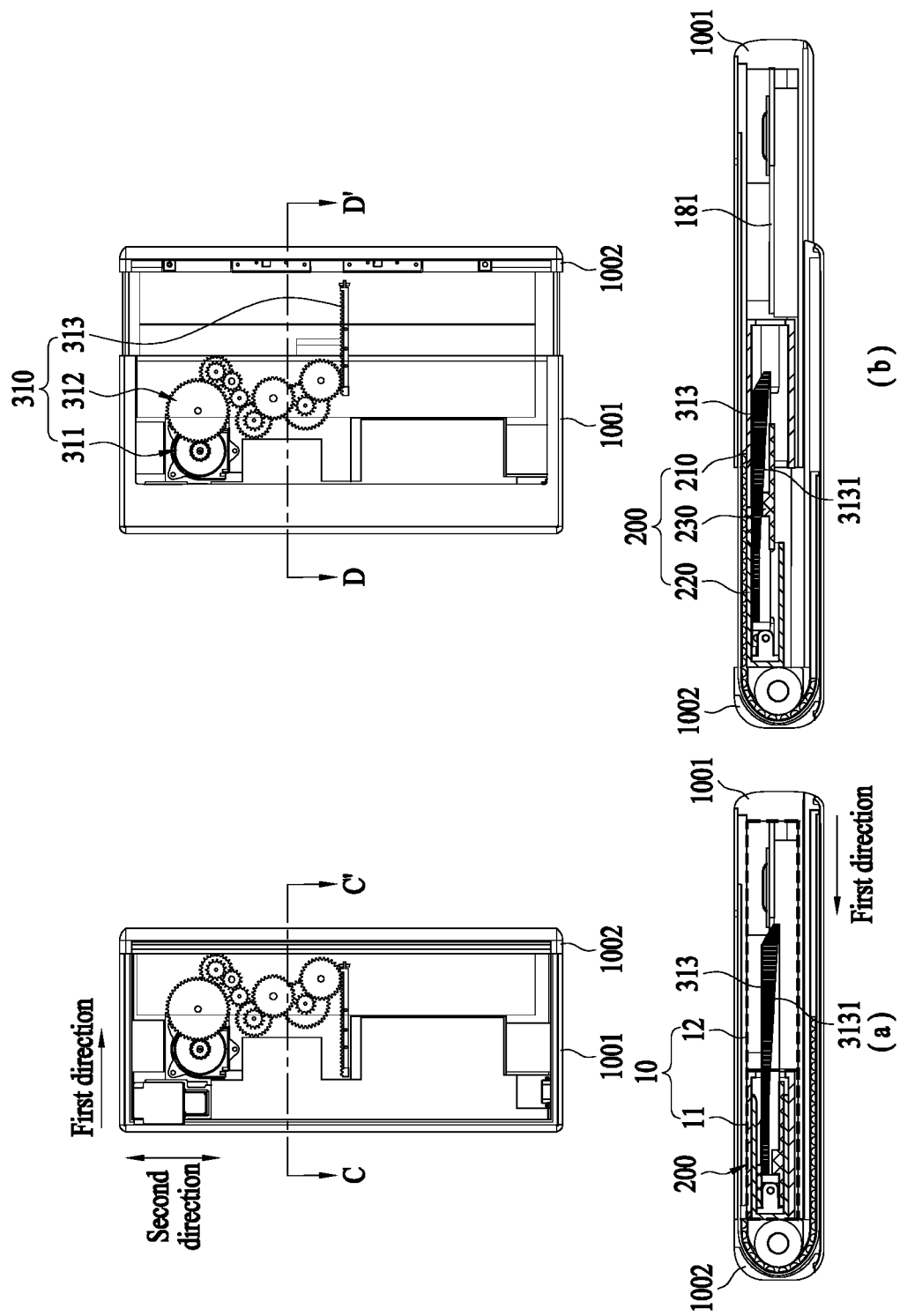
FIG. 4 illustrates perspective views and cross-sectional views obtained before and after an expansion of a display of an electronic apparatus according to another example embodiment of the present disclosure.

(a) of FIG. 4 illustrates a perspective view and a cross-sectional view taken along a line C-C' as viewed from a rear surface of an electronic device before an expansion of a display. (b) of FIG. 4 illustrates a perspective view and a cross-sectional view taken along a line D-D' as viewed from the rear surface of the electronic device after the expansion of the display.

An expansion support 200 may be expanded or contracted by a driver 310. The driver 310 may be provided in a form of an actuator including a motor 311 and driven based on an expansion signal or a contraction signal generated by a controller. The expansion signal may correspond to an expansion of the display front surface area 151F and the contraction signal may correspond to a reduction of the display front surface area 151F.

The driver 310 may provide force for extending the expansion support 200 in a first direction which is a withdraw direction of a sub-member 220.

The driver 310 may include the driving motor 311 that rotates by receiving power, a gear part 312 that transfers a rotatory force of the driving motor 311 to an appropriate position at an appropriate gear ratio, and a gear rack 313 that converts a rotational motion of the gear part 312 into a straight line motion.

The driving motor 311 and the gear part 312 of which positions are fixed may be fixed to a side of the first frame 1001, that is, an invariable member in the electronic apparatus 100. The gear rack 313 may be fixed to a side of the second frame 1002, that is, a variable member.

Specifically, the driving motor 311 and the gear part 312 may be fixed to the first frame 1001 through a main-PCB 181. A main member 210 of the expansion support 200 may be fixed to the first frame 1001 through a middle frame 1004. The gear rack 313 may be fixed to the sub-member 220 of the expansion support 200. The gear rack 313 may be driven by the driver 310 to be moved, and simultaneously, the sub-member 220 moves such that the expansion support 200 extends or contracts.

The sub-member 220 of the expansion support 200 may be fixed to the second frame 1002, so that a driving force of the driver 310 expands or reduces the second frame 1002, furthermore, the display front surface area 151F.

To move the sub-member 220 and the second frame 1002 in the first direction, the gear rack 313 may extend in the first direction. Specifically, the gear rack 313 may be located around a center of the expansion support 200 based on a second direction, so as to evenly transfer a force to the sub-member 220.

Also, the driving motor 311 and the gear part 312 may use a portion of an inner space of the expansion support 200 to maximally secure a space for the electronic device part.

The gear rack 313 may form an inclination 3131 in an area corresponding to a curved portion of a guide part. The sub-member 220 may move based on a shape of the curved portion. Due to such movement, a positional change between the gear rack 313 and a gear may occur in a thickness direction. The gear rack 313 fixedly provided to the sub-member 220 may form the inclination 3131 descending from the area corresponding to the curved portion such that a stable contact is to be maintained even when the gear part 312 descends.

Figure 5:
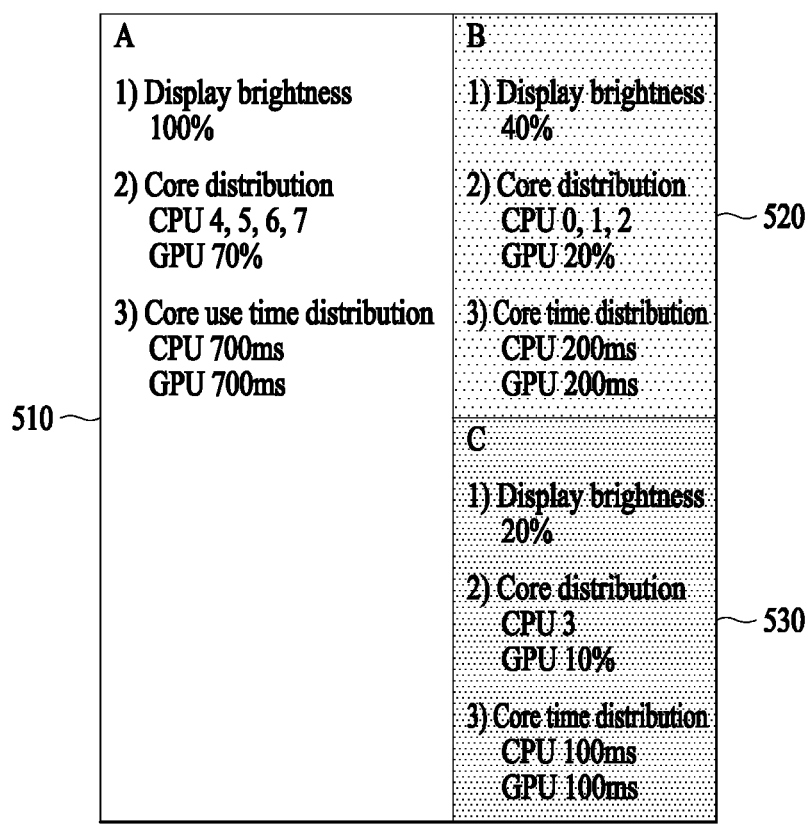
FIG. 5 is a diagram illustrating resource allocation information used in an electronic apparatus according to an example embodiment of the present disclosure.

FIG. 5 is a diagram illustrating resource allocation information used in an electronic apparatus according to an example embodiment of the present disclosure. Specifically, FIG. 5 illustrates content areas of a plurality of applications displayed on an electronic apparatus and resource allocation information thereof.

Referring to FIG. 5, a display may display content of a plurality of applications (e.g., A, B, C). The content of the plurality of applications may be displayed in different areas.

For example, as illustrated in FIG. 5, content of an application A (hereinafter, referred to as a first application) may be displayed in a first area 510, content of an application B (hereinafter, referred to as a second application) may be displayed in a second area 520, and content of an application C (hereinafter, referred to as a third application) may be displayed in a third area 530.

The resource allocation information may differ for each application. The resource allocation information may refer to information on a value (or a part, or a ratio) allocated for each application to run the corresponding application with respect to various resources (e.g., a central processing unit (CPU), a graphics processing unit (GPU), a display brightness, a display resolution, and a frame per second (FPS)) included in the electronic apparatus. For example, the resource allocation information may be information on a value designated (or set) to be used for running a predetermined application for each resource. Depending on example embodiments, the resource allocation information may also be referred to as "setting information" and the present disclosure is not limited by such terminology.

For example, the resource allocation information may include information on at least one of a part in which a CPU for each application is used (hereinafter, referred to as "CPU-used part"), a CPU usage rate, a CPU use time, a GPU usage rate, a GPU use time, an FPS, a resolution, a display brightness, and a loudness. Related description will be made in detail later.

The CPU-used part may refer to some of a plurality of parts used for running a predetermined application (e.g., the first application, the second application, and the third application) when a CPU included in the electronic apparatus is divided into the plurality of parts. The CPU usage rate may refer to a ratio of the CPU used for running the predetermined operation among operations of the entire CPU. The CPU use time may refer to a time in which the CPU is used for running the predetermined application.

The GPU usage rate may refer to a ratio of the GPU used for running the predetermined operation among operations of the entire GPU. The GPU use time may refer to a time in which the GPU is used for running the predetermined application. The GPU use time may refer to a time in which the CPU is used for running the predetermined application.

The FPS may refer to a frame per second displayed on the display to display content associated with the predetermined application. The resolution may refer to a degree corresponding to a number of pixels or dots by which the content associated with the predetermined application is displayed on the display.

The display brightness may refer to a degree of brightness to which the content associated with the predetermined application is displayed on the display. As an example, the display brightness may range from a minimum brightness of 0% to a maximum brightness of 100%. As another example, the display brightness may also be expressed by a dimming degree of the display. In this example, a dimming degree of 0% may correspond to the maximum brightness.

A loudness may refer to an amplitude of sound obtained when the content associated with the predetermined application is auditory content. For example, the loudness may range from a minimum of "0" to a maximum of "100."

As illustrated in FIG. 5, the resource allocation information may be classified for each application. Specifically, for running of the first application, a display brightness of 100% (maximum brightness of 100% and minimum brightness of 0%) may be allocated, CPU 4, 5, 6, 7 may be allocated, and 70% of the GPU may be allocated. In addition, 700 milliseconds (ms) may be allocated as each of the CPU use time and the GPU use time.

For running of the second application, a display brightness of 40% may be allocated, CPU 0, 1, 2 may be allocated, and 20% of the GPU may be allocated. In addition, 200 ms may be allocated as each of the CPU use time and the GPU use time.

For running of the third application, a display brightness of 20% may be allocated, CPU 0, 1, 2 may be allocated, and 20% of the GPU may be allocated. In addition, 100 ms may be allocated as each of the CPU use time and the GPU use time.

Figure 6:
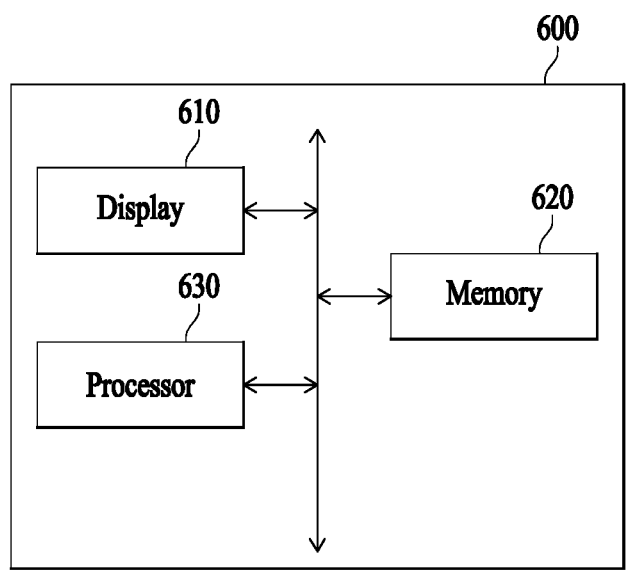
FIG. 6 is a functional block diagram illustrating an electronic apparatus according to an example embodiment of the present disclosure.

FIG. 6 is a functional block diagram illustrating an electronic apparatus according to an example embodiment of the present disclosure. Hereinafter, a component (e.g., a motor, a display, a controller) included in the electronic apparatus may refer to a unit to process at least one function or operation, and may be implemented in hardware, software, or a combination of hardware and software.

Referring to FIG. 6, an electronic apparatus 600 may include a display 610, a memory 620, and a controller 630. The display 610 may be implemented by a computing device including a microprocessor, which may be the same for the memory 620 and the controller 630 as described below.

The display 610 may display content corresponding to an application in response to the application being executed. The content corresponding to the application may include various screens provided by the application. When a plurality of applications is executed, the display 610 may display content of each of the applications.

In the example embodiment, content corresponding to a first application may be displayed in a first area of the display 610 and content corresponding to a second application may be displayed in a second area of the display 610. The first area may be different from the second area but not be limited thereto.

In the example embodiment, a size of the display 610 viewable on one surface may be changed based on a control signal. For example, an exposed size of the display 610 may be changed based on a control signal related to a size change of the display 610.

When a change corresponding to a size increase is performed on the display 610, resource allocation information (e.g., a display brightness) corresponding to a display area to be exposed on one surface based on the control signal may be determined based on the resource allocation information corresponding to an exposed display area adjacent to the display area to be exposed. For example, when the first area is the display area to be exposed and the second area is the exposed display area adjacent to the first area, resource allocation information of the first area may be determined based on resource allocation information of the second area.

The memory 620 may store resource allocation information associated with each of the plurality of applications. For example, as resource allocation information designated for the first application, information on a CPU-used part, a GPU usage rate, an FPS, and a display brightness may be stored in the memory 620. Also, as resource allocation information designated for the second application differing from the resource allocation information designated for the first application, information on a CPU-used part, a GPU usage rate, an FPS, and a display brightness may be stored in the memory 620.

In terms of a part of allocation for the same resources, the resource allocation information associated with the first application may be different from the resource allocation information associated with the second application. As an example, a part of the CPU used for running the first application may be different from a part of the CPU used for running the second application. As another example, an FPS for running the first application may be different from an FPS for running the second application. As another example, a display brightness of an area in which the content of the first application is displayed may be different from a display brightness of an area in which the content of the second application is displayed.

The controller 630 may execute the plurality of applications. Specifically, the controller 630 may allow the display 610 to display content associated with each of the plurality of applications in response to an input being acquired to execute the plurality of applications. The content associated with the plurality of applications may be displayed in different areas of the display 610.

The controller 630 may identify resource allocation information associated with each of the plurality of applications. For example, when the plurality of applications includes the first application and the second application, the controller 630 may identify the resource allocation information associated with the first application and the resource allocation information associated with the second application. The resource allocation information may include information on a part (or ratio) allocated for running an application for each resource constituting the electronic apparatus 600.

The controller 630 may run the plurality of applications based on the resource allocation information. Specifically, the controller 630 may run the first application based on the resource allocation information associated with the first application and run the second application based on the resource allocation information associated with the second application.

In such case, resources may be differently allocated for each area in which content associated with an application is displayed. Thus, for example, a display brightness, a resolution, or a running speed may be independently determined to be different from one another.

As an example, when the resource allocation information includes information on the display brightness and content of the plurality of applications is displayed on the display together, the display brightness may be independently adjusted for each area in which the corresponding content is displayed and thus, represented differently.

As another example, when the resource allocation information includes information on a display resolution and the content of the plurality of applications is displayed on the display together, the display resolution may be independently adjusted for each area in which the corresponding content is displayed and thus, represented differently.

When the resource allocation information includes information on a CPU usage rate and the content on the plurality of applications is displayed on the display together, an application running speed may be different for each area in which the corresponding content is displayed.

In the example embodiment, resource allocation information may be determined for each area in which an application is displayed, for each category related to the application, or for each resource usage information corresponding to a previous execution of the application.

As an example, resource allocation information may be designated for each area in which an application is displayed. In this example, when content associated with the application is displayed, the controller 630 may identify an area in which the content is displayed on the display 610. The controller 630 may identify resource allocation information corresponding to the identified area and allocate resources for running the application.

As another example, resource allocation information may be designated for each category related to an application. In this example, in response to the application being executed, the controller 630 may identify a category (e.g., a game, a messenger, and a photo) to which the executed application belongs. The controller 630 may identify resource allocation information corresponding to the identified category and allocate resources for running the application. A related example will be described in detail with reference to FIG. 9.

As another example, resource allocation information may be determined for each piece of resource usage information corresponding to a previous execution of an application. In this example, the controller 630 may identify information on resources used at least a predetermined frequency or at least a predetermined percentage when the application has been executed in the past. The controller 630 may allocate resources for running the application based on information on the identified resources. For example, when it is verified from the resource usage information of the previous execution that an average GPU usage rate is 30% in the previous execution of the application, the controller 630 may allocate 30% of a GPU among resources of the application. Related description will be made in detail with reference to FIG. 16.

In the example embodiment, resource allocation information may be determined by a user. For example, the controller 630 may provide a user with an input window for designating resource allocation information for each application. When a user input is acquired through the provided input window, the controller 630 may set resource allocation information for the corresponding application based on the user input. A related example will be described with reference to FIG. 15.

Although not shown, the electronic apparatus 600 may further include a battery that supplies power for driving the electronic apparatus 600. In this case, the controller 630 may identify a remaining capacity of the battery. When the remaining capacity of the battery is less than or equal to a predetermined value, the controller 630 may change resource allocation information of an application that is on execution.

For example, when a remaining capacity of the battery is less than or equal to 10%, the controller 630 may reduce a display brightness to 50% of a current resource allocation value.

In some cases, an allocation value for each resource of the resource allocation information may be designated for each stage. For example, resource allocation information of a first stage may indicate a stage of reflecting an initial value without a change. Also, a second stage may indicate a stage of operating at 80% of the initial value (for example, when an initial value of an FPS is 10, a value is 8 equal to 80% of 10 in the second stage).

In such cases, the controller 630 may adjust a stage of the resource allocation information based on the remaining capacity of the battery.

In the example embodiment, the controller 630 may receive a user input for one of the content associated with the plurality of applications. For example, the controller 630 may receive a user input to select an area in which the content associated with the first application is displayed. The controller 630 may identify an application related to the user input.

The controller 630 may set the resource allocation information of the identified application to be in a first state and set resource allocation information of other applications (e.g., unidentified applications) to be in a second state.

As an example, the first state may be a state in which each value of the resource allocation information is maintained as an initial value. Also, the second state may be a state in which each value of the resource allocation information is to be 80% of the initial value.

As another example, the first state may be a state in which each value of the resource allocation information is to be 110% of the initial value. Also, the second state may be a state in which each value of the resource allocation information is to be 80% of the initial value. In this case, resources reduced in the second state may be used to realize the first state.

The user input may be implemented as various inputs, for example, an input based on a pupil recognition of a sensor and a physical touch input applied by a user and is not limited to the foregoing examples.

An example of changing resource allocation information in response to a user input for one application will be described in detail with reference to FIGS. 10 through 13.

In the example embodiment, when content associated with three applications is on execution, the controller 630 may receive an input for two applications. In this case, the controller 630 may allocate resources based on an initial value of resource allocation information of an application related to the received input.

In some cases, the input for two applications may be, for example, an input to switch the two applications. In such cases, display settings of the two applications may be switched (or exchanged). Alternatively, areas in which the two applications are displayed may be switched. A related example will be described with reference to FIG. 14.

Figure 7:
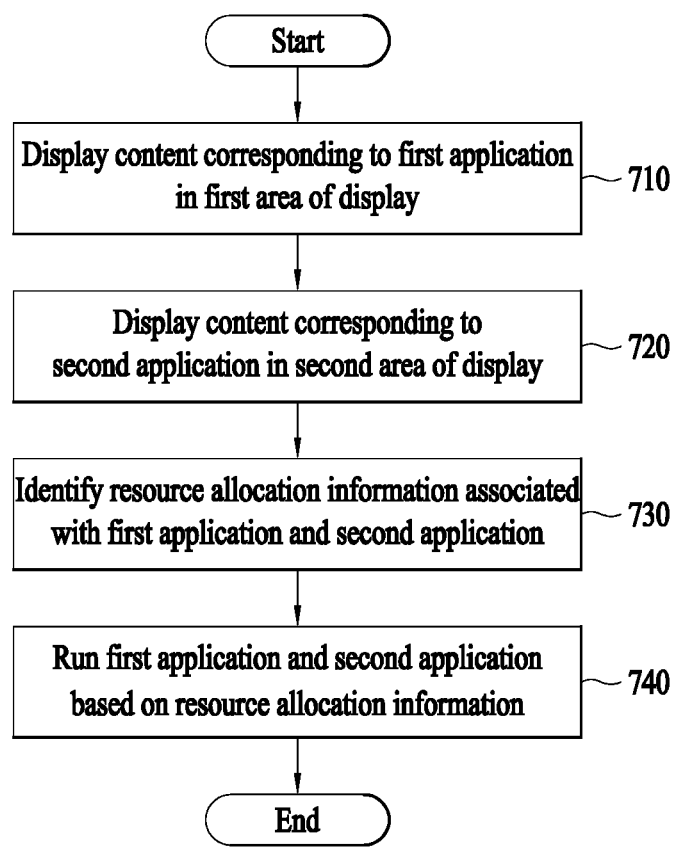
FIG. 7 is a flowchart illustrating operations of a control method of an electronic apparatus according to an example embodiment of the present disclosure.

FIG. 7 is a flowchart illustrating operations of a control method of an electronic apparatus according to an example embodiment of the present disclosure. Hereinafter, as would be apparent to one skilled in the art, operations of FIG. 7 may be performed in a different order from that shown in the drawing in some cases. Also, repeated description of FIG. 6 will be omitted.

Referring to FIG. 7, in operation 710, an electronic apparatus (or controller) may display content corresponding to a first application in a first area of a display. Specifically, in response to the first application being executed, the electronic apparatus may display the content of the first application in the first area of the display. The first area may be, for example, a predetermined position or a position designated to display the content in response to the execution of the first application but not be limited thereto.

In operation 720, the electronic apparatus may display content corresponding to a second application in a second area of the display. Specifically, in response to the second application being executed, the electronic apparatus may display the content of the second application in the second area of the display. The second area may be, for example, a predetermined position or a position designated to display the content in response to the execution of the second application but not be limited thereto.

In the example embodiment, operations 710 and 720 may be performed irrespective of an order. In some cases, the content associated with the first application and the second application may be displayed in response to an expansion of the display. A related example will be described with reference to FIG. 8.

In operation 730, the electronic apparatus may identify resource allocation information associated with the first application and the second application. The resource allocation information may be determined for each application and may be a value (e.g., a CPU usage rate) corresponding to a degree to which resources (or setting) of the electronic apparatus are allocated for running the corresponding application.

Here, the resource may be a hardware or software configuration of the electronic apparatus used for an execution of an application and may be, for example, a CPU, a GPU, and a display. The resource allocation information may be a value by which the resource is allocated for each application to run the corresponding application and may be, for example, a usage rate and a degree of brightness. In some cases, the resource may also be referred to as "setting" and the resource allocation information may also be referred to as "setting information." However, the present disclosure is not limited by such terminologies.

In the example embodiment, when the first application and the second application are executed, the electronic apparatus may identify the resource allocation information of each of the first application and the second application.

In operation 740, the electronic apparatus may run the first application and the second application based on the resource allocation information. The electronic apparatus may allocate the resource based on the resource allocation information identified for each application, thereby running the corresponding application.

For example, when the resource allocation information of the first application includes a GPU usage rate of 60%, the electronic apparatus may allocate 60% of a GPU for running of the first application so as to run the first application.

In the example embodiment, the electronic apparatus may adjust the resource allocation information based on a user input reception or a state of a battery. A related example will be described with reference to FIGS. 9 through 17.

Figure 8:
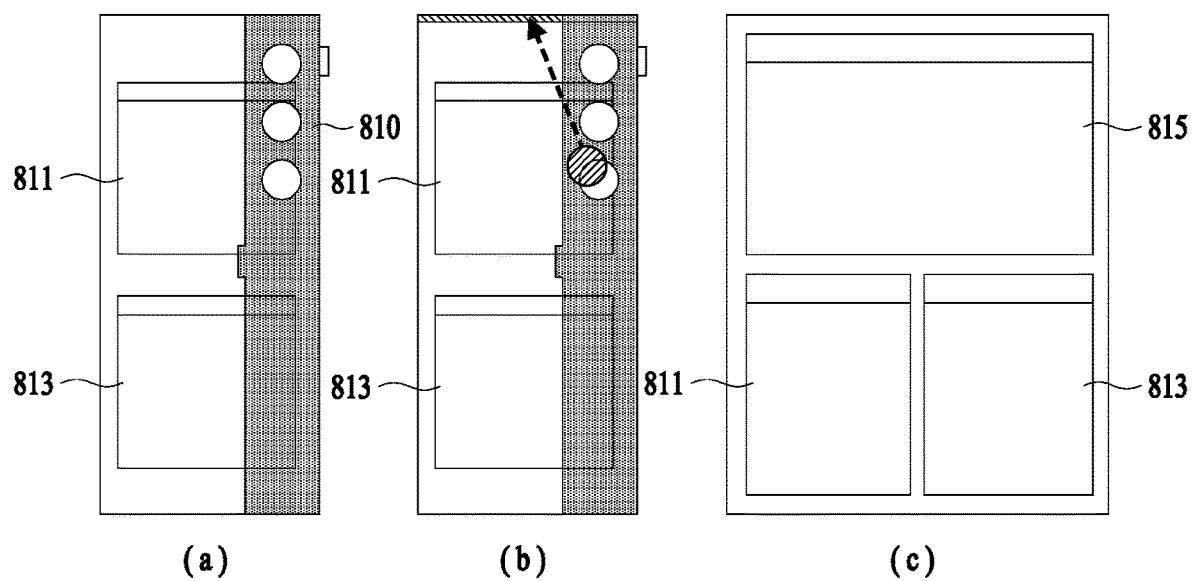
FIG. 8 illustrates examples of displaying content corresponding to a plurality of applications in an electronic apparatus according to an example embodiment of the present disclosure.

FIG. 8 illustrates examples of displaying content corresponding to a plurality of applications in an electronic apparatus according to an example embodiment of the present disclosure.

Referring to (a) of FIG. 8, bar content 810 may be executed in a state in which first content 811 and second content 813 associated with a first application are displayed.

In this instance, the bar content 810 may be executed based on a user input or in response to a predetermined condition being satisfied. As an example, when a user touch input for a predetermined area in a right edge of a display is received, the bar content 810 may be displayed. As another example, when a message is received, the bar content 810 may be displayed.

The bar content 810 may include an application icon. In this case, as illustrated in (b) of FIG. 8 an input to move the application icon may be received. The input to move the application icon may be, for example, a drag input but not be limited thereto.

Referring to (b) of FIG. 8, the application icon may move toward a top of the display. In this case, the second application corresponding to the application icon may be executed, and then, as illustrated in (c) of FIG. 8, third content 815 associated with the second application may be displayed in an upper area (e.g., a second area) of the display. In this instance, the first content 811 and the second content 813 may be moved to a lower area (e.g., a first area) of the display, and then displayed therein.

In the example embodiment, in response to the second application being executed, the display may be expanded as illustrated in (c) of FIG. 8. For example, a size viewable on one surface of the display may be changed based on a control signal.

As shown in the drawings, when a plurality of applications is executed in parallel and content associated with the plurality of applications are displayed on the display together, the electronic apparatus may run the applications based on resource allocation information for each of the applications for smooth execution of the applications.

FIG. 9 is a diagram illustrating an example of determining resource allocation information for each category of a plurality of applications in an electronic apparatus according to an example embodiment of the present disclosure. Specifically, FIG. 9 illustrates a case in which resource allocation information is determined for each of three categories.

Referring to FIG. 9, applications may be classified into a plurality of categories. A category may be formed based on characteristics of applications and may include, for example, a game category, a messenger category, and a shopping category. In FIG. 9, each of the categories may be referred to as a first category, a second category, and a third category as general terms.

For each category of applications, intensively used resources may be different. For example, because an application in the game category requires high-end graphics, a high value of a GPU usage rate may be required in comparison to other applications. Also, because a content reproducing application needs to reproduce content without interruption, a high value of an FPS may be required in comparison to other applications.

Resource allocation information of each of the plurality of categories may be differently determined based on a characteristic of each category as illustrated in the drawing.

Although not shown, a category for each application installed in the electronic apparatus may be determined by a user or through an identification of the electronic apparatus. In this instance, resource allocation information of an application may be determined based on resource allocation information of a category to which the application belongs.

For example, 'application A' may belong to the game category. In this example, resource allocation information of 'application A' may be determined to match the resource allocation information of the game category.

In the example embodiment, the resource allocation information may be determined for each area. For example, the resource allocation information may be determined for each area corresponding to each category (e.g., the first category, the second category, and the third category) of FIG. 9. In this example, when an application is executed, the electronic apparatus may identify an area in which content associated with the executed application is displayed and run the application based on resource allocation information corresponding to the identified area.

For example, when content associated with the first application is displayed in an area corresponding to the first category of FIG. 9, the first application may be run based on the resource allocation information of the first category.

Figure 10:
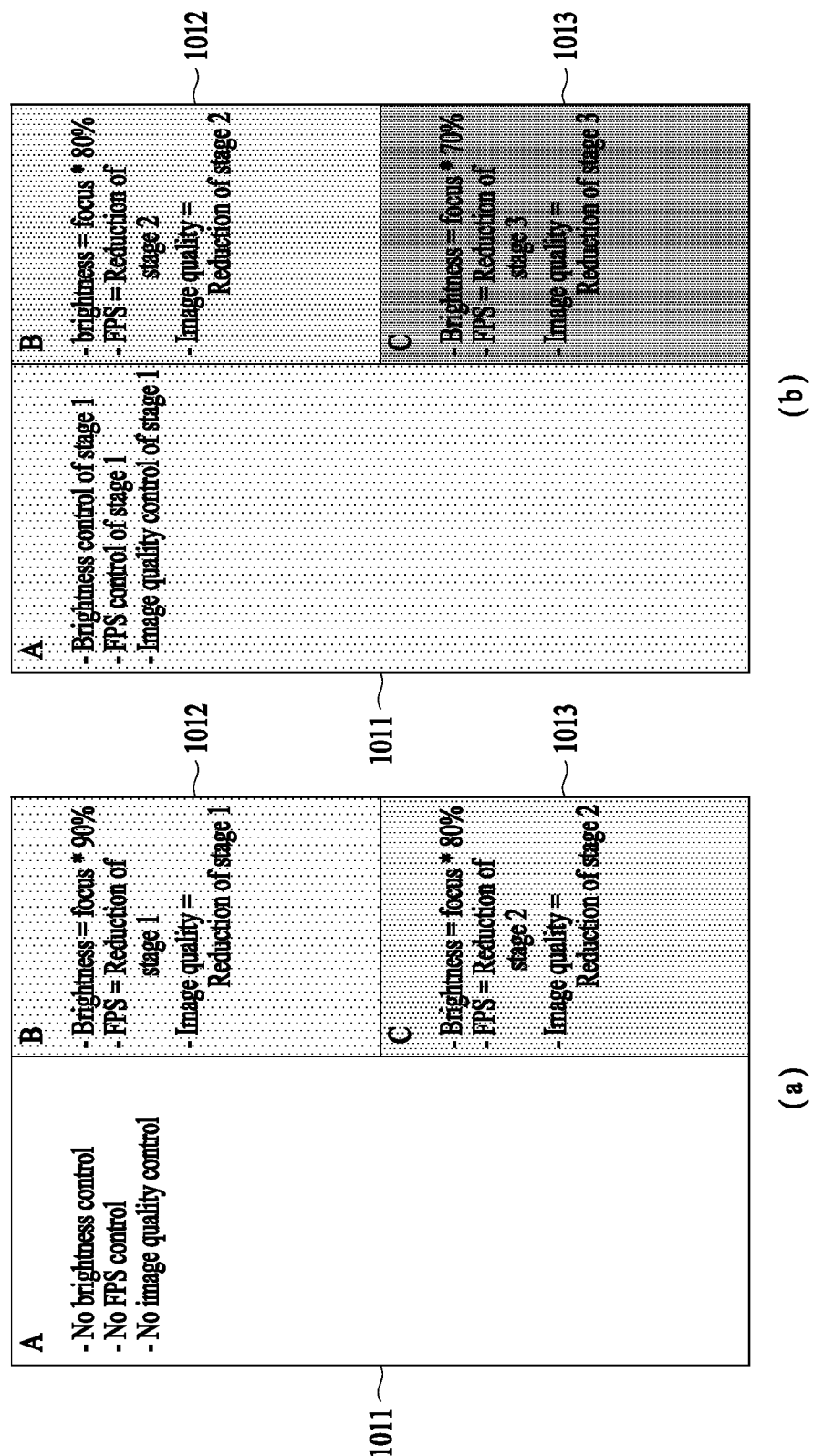
FIG. 10 illustrates examples of an electronic apparatus entering a power saving mode according to an example embodiment of the present disclosure.

FIG. 10 illustrates examples of an electronic apparatus entering a power saving mode according to an example embodiment of the present disclosure.

(a) of FIG. 10 illustrates an example of adjusting resource allocation information of other applications when a remaining capacity of a battery is less than or equal to a first value and a user input is applied to an application 'A'.

Referring to (a) of FIG. 10, content associated with the application 'A' (hereinafter, referred to as a first application), an application 'B' (hereinafter, referred to as a second application), and an application 'C' (hereinafter, referred to as a third application) may be displayed in different areas.

Specifically, the content associated with the first application may be displayed in a first area 1011, the content associated with the second application may be displayed in a second area 1012, and the content associated with the third application may be displayed in a third area 1013.

In (a) of FIG. 10, each application may be in a state in which a user input is applied to the first application while the corresponding application is run based on designated resource allocation information. For example, the user input may be a focus input identified based on a touch input or a pupil movement.

In the example embodiment, when the user input is applied to the first application, the electronic apparatus may adjust a stage of resource allocation information associated with running of each of the second application and the third application. The stage of the resource allocation information may be to reduce a resource allocation value such that power lower than a set value is consumed. Also, the stage of the resource allocation information may be set based on a degree of reduction. For example, when an initial set value is 100%, a first stage reduction may be a stage of reducing by 100% and a second stage reduction may be a stage of reducing by 20%.

Specifically, as illustrated in (a) of FIG. 10, the resource allocation information associated with the first application may not be controlled and the first application may be run based on an existing resource allocation value. A first stage reduction adjustment may be performed in a case of the second application. A second stage reduction adjustment may be performed in a case of the third application.

A stage adjustment for each application may be designated in advance. For example, when the stage adjustment is performed based on a user input, it may be designated that the first stage reduction adjustment is performed for the second application and the second stage reduction adjustment is performed for the third application.

In the example embodiment, the stage adjustment of the resource allocation information may be performed further based on a remaining capacity of the battery when a predetermined condition (e.g., the remaining capacity less than a first value) is satisfied. For example, when the remaining capacity of the battery is less than or equal to 15%, and when the user input is applied to the first application, the stage adjustment may be performed as illustrated in (a) of FIG. 10.

The stage adjustment may be differently performed for each application as illustrated in (a) of FIG. 10. However, embodiments are not limited thereto. For example, the first stage reduction adjustment may also be performed for the third application similarly to the second application.

In the example embodiment, when the remaining capacity of the battery is considered, an additional stage adjustment may be performed based on a value of the remaining capacity. Related description will be made with reference to (b) of FIG. 10.

Specifically, referring to (b) of FIG. 10, when the remaining capacity of the battery is less than a second value (e.g., 10%), a stage of resource allocation information of each of the first application, the second application, and the third application may be adjusted. That is, a resource allocation value of each of the applications may be adjusted to be reduced by one stage.

As such, when the resource allocation information is adjusted based on the remaining capacity of the battery, energy consumption of the electronic apparatus may be reduced, which may prolong an operation time of the electronic apparatus.

FIG. 11 illustrates examples of applying an input to at least two of a plurality of applications in an electronic apparatus according to an example embodiment of the present disclosure.

FIG. 11, illustrates examples in which content associated with a first application, a second application, and a third application are displayed in different areas as illustrated in FIG. 10.

Specifically, (a) of FIG. 11, illustrates an example in which a user input is applied to the first application and the second application among the three applications. In this case, a stage of resource allocation information associated with running of the third application may be adjusted. Also, resource allocation information associated with running of the first application and the second application may be maintained as existing values.

In the example embodiment, a remaining capacity of a battery may be additionally considered. In this case, (a) of FIG. 11, relates to an example in which a user input is applied to each of the first application and the second application and the remaining capacity of the battery is less than or equal to a first value.

In some cases, the user input may be applied to an application for which a stage adjustment is required (e.g., the third application). However, the present disclosure is not limited thereto.

The user input may be implemented in various types. The user input may include, for example, a touch, a long touch, or a knock-on input. In some cases, an input for the first application (e.g., a touch) may be different from an input for the second application (e.g., a long touch). However, the present disclosure is not limited thereto.

(b) of FIG. 11, illustrates a case in which stages of resource allocation information of all applications on execution are adjusted based on the remaining capacity of the battery less than a second value. Here, the second value may be less than the first value described above. That is, a case in which the remaining capacity of the battery is less than the second value may indicate a case in which a power saving mode is required.

In this case, as illustrated in (b) of FIG. 11, the stages of the resource allocation information of the first application and the second application may be adjusted likewise the stage of the resource allocation information of the third application.

Figure 12:
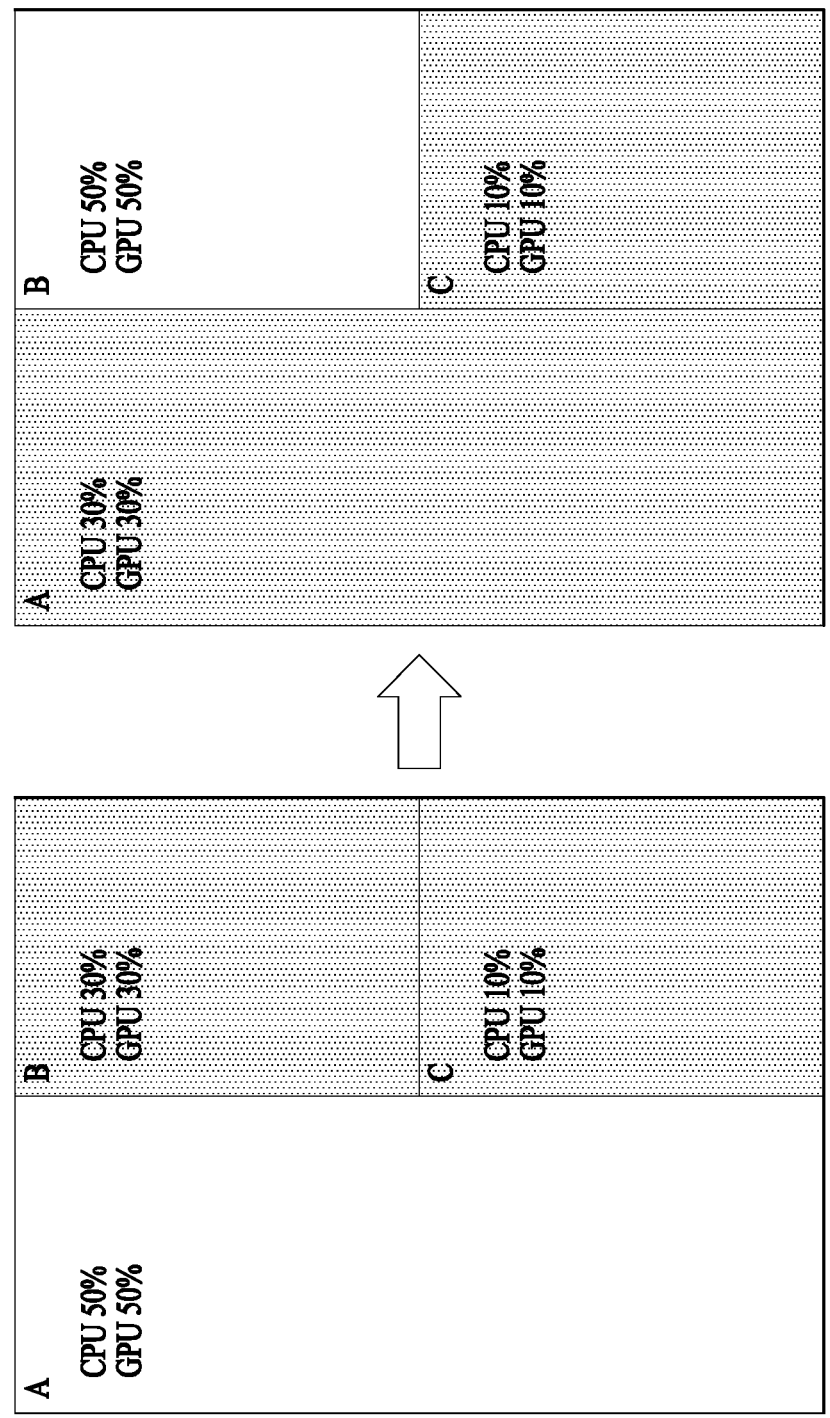
FIG. 12 illustrates an example of changing an input for one of a plurality of applications in an electronic apparatus according to an example embodiment of the present disclosure.

FIG. 12 illustrates an example of changing an input for one of a plurality of applications in an electronic apparatus according to an example embodiment of the present disclosure.

Referring to FIG. 12, a user input may be moved. Specifically, the user input may be applied to an application 'A', and then moved to an application 'B'. In such case, resource allocation information may be adjusted in response to the user input being moved.

For example, when the user input is applied to the application 'A', resource allocation information of applications other than the application 'A' may be adjusted. Thereafter, when the user input is applied to the application 'B', resource allocation information of applications other than the application 'B' may be adjusted.

In the example embodiment, when the resource allocation information of the second application is reduced based on the user input, the resource allocation information of the first application to which the user input is applied may be increased by a value corresponding to a decrement of the second application. For example, when a CPU usage rate of the second application is reduced from 40% to 30%, a CPU usage rate of the first application may be increased from 50% to 60%.

In such case, resources may be intensively allocated to an application to be used by a user such that the application is efficiently run using limited resources.

In the example embodiment, when a power saving mode or an ultra-power-saving mode is designated in association with the resources of the electronic apparatus, a stage adjustment of the resource allocation information may correspond to an adjustment to the power saving mode or the ultra-power-saving mode. For example, a first stage reduction adjustment may correspond to setting the running of the corresponding application to be in the power saving mode. Also, a second state reduction adjustment may correspond to setting the running of the corresponding application to be in the ultra-power-saving mode.

Figure 13:
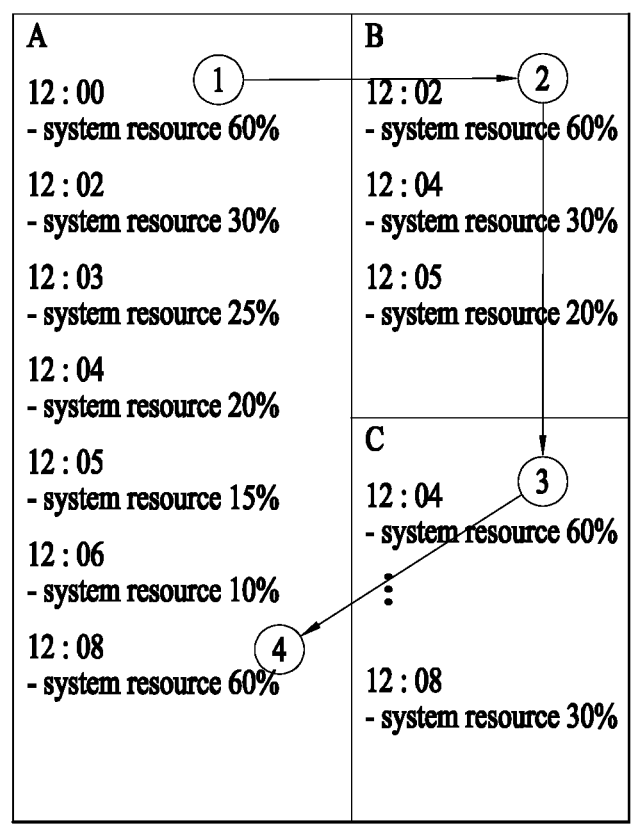
FIG. 13 illustrates an example of moving an input in an electronic apparatus according to an example embodiment of the present disclosure.

FIG. 13 illustrates an example of moving an input in an electronic apparatus according to an example embodiment of the present disclosure. Specifically, FIG. 13 illustrates an example of adjusting resource allocation information on a time-by-time basis when a user input is moved.

Referring to FIG. 13, a user input may move sequentially. For example, as shown in the drawing, a user input may be applied first to an application 'A' at 12:00, moved to an application 'B' at 12:02, and then moved to an application 'C' at 12:04. Also, the user input may be moved to the application 'A' at 12:08.

Resource allocation information of an application to which the user input is applied may be maintained at a predetermined ratio (e.g., 60%). When a current input is released in response to the user input being moved, resource allocation information of an application released from the user input may be reduced at intervals of a predetermined ratio on a time-by-time basis.

For example, when the user input is applied as illustrated in the drawing, the resource allocation information of the application 'A' may be 60%. However, when the user input is moved to another application (e.g., the application 'B'), the resource allocation information of the application 'A' may be reduced by 5% per minute.

Figure 14:
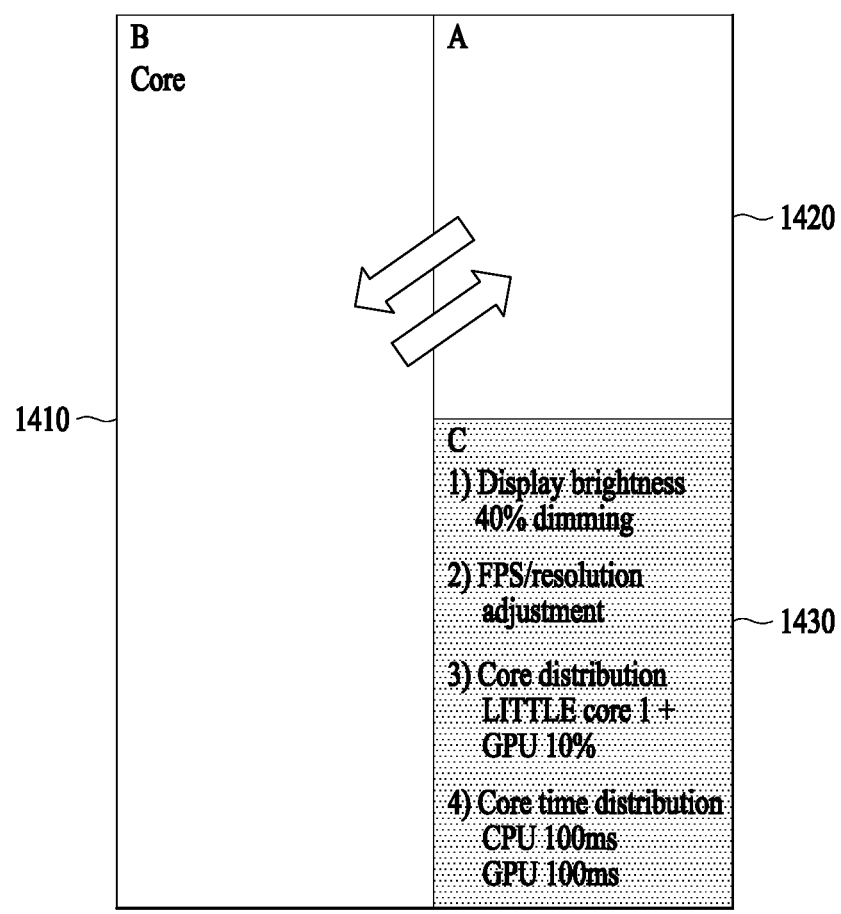
FIG. 14 illustrates an example of applying a switch input in an electronic apparatus according to an example embodiment of the present disclosure.

FIG. 14 illustrates an example of applying a switch input in an electronic apparatus according to an example embodiment of the present disclosure.

Referring to FIG. 14, in a state in which different applications are displayed in a first area 1410 and a second area 1420, an input to switch the applications of the first area 1410 and the second area 1420 may be received.

In this case, the applications of the areas may be exchanged. Also, the resources of the electronic apparatus may be maximally used to run the applications of the first area 1410 and the second area 1420 such that the application exchange is smoothly performed.

Accordingly, a resource allocation for an application associated with a third area 1430 may be adjusted. For example, resources of the application associated with the third area 1430 may be allocated at a level of 60% of the resource allocation information.

In some cases, a resource allocation amount reduced in association with the third area 1430 may be used to run the applications of the first area 1410 and the second area 1420.

Figure 15:
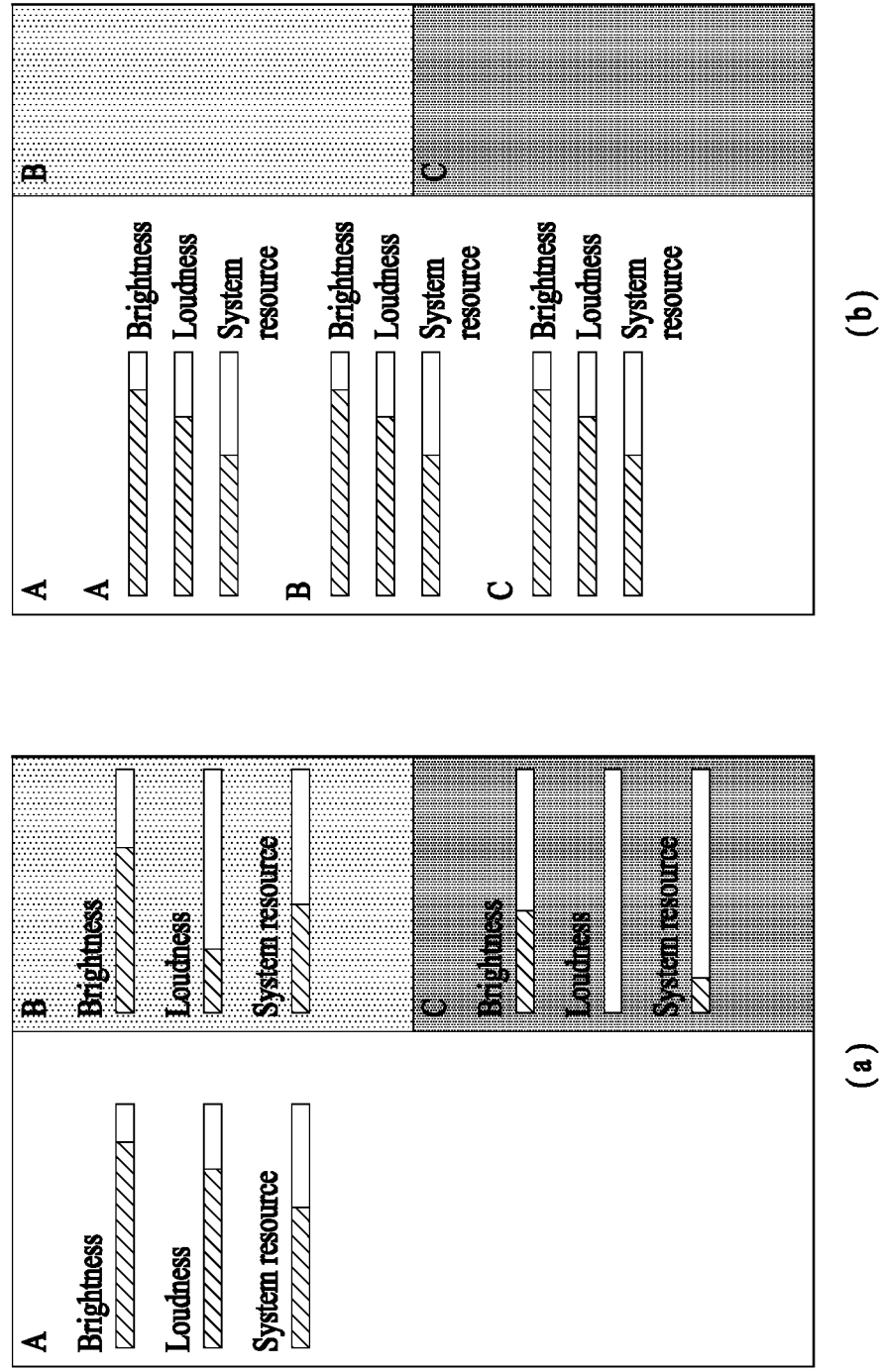
FIG. 15 illustrates examples of a resource allocation information setting window of an electronic apparatus according to an example embodiment of the present disclosure.

FIG. 15 illustrates examples of a resource allocation information setting window of an electronic apparatus according to an example embodiment of the present disclosure. Specifically, FIG. 15 illustrates examples of a user interface for receiving a user input when resource allocation information is determined based on the user input.

Referring to (a) of FIG. 15, resource allocation information may be determined based on content provided for each application. Specifically, the resource allocation information may be set through an entry to a setting window of each of an application 'A', an application 'B', and an application 'C'.

As shown in the drawings, the resource allocation information may be determined by selecting a degree to which a bar is filled based on a user input. For example, when a bar corresponding to a brightness is fully filled, the brightness may be determined to be maximum, that is, 100%.

In the example embodiment, system resources may be a CPU or a GPU. A usage rate of the CPU or the GPU may be determined based on a bar.

Referring to (b) of FIG. 15, content for determining the resource allocation information for each application may be displayed in a predetermined area irrespective of an area in which the corresponding application is displayed.

A user input related to a determination of the resource allocation information is not limited to the examples illustrated in FIG. 15 and may be implemented in various forms such as a text input directly applied by a user, for example.

Figure 16:
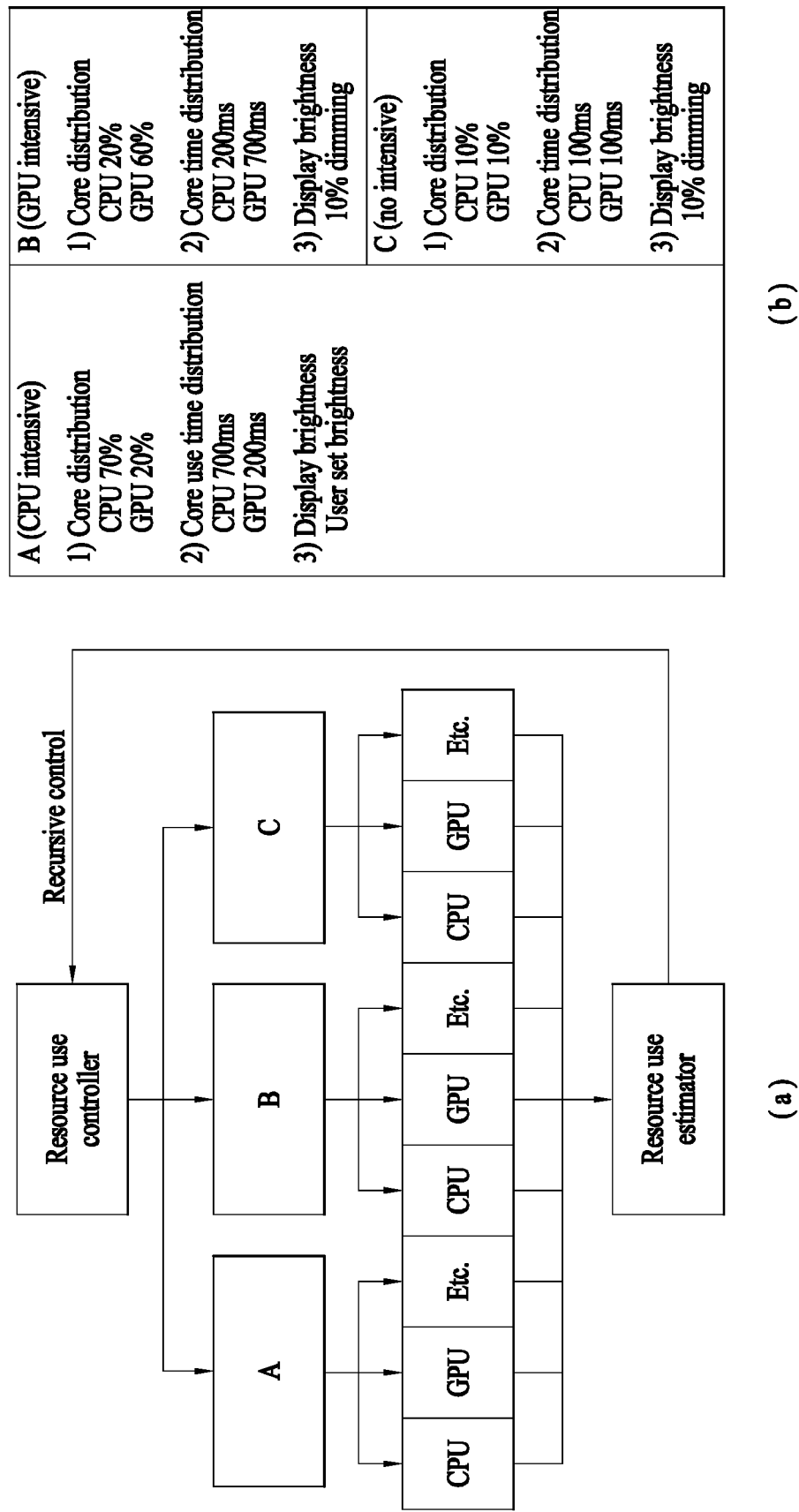
FIG. 16 illustrates examples of setting resource use information based on a previous use of an application in an electronic apparatus according to an example embodiment of the present disclosure.

FIG. 16, illustrates examples of setting resource use information based on a previous use of an application in an electronic apparatus according to an example embodiment of the present disclosure.

(a) of FIG. 16, illustrates a process of acquiring resource use information corresponding to a previous use for each of applications 'A, B, and C'. Referring to (a) of FIG. 16, resources (e.g., CPU and GPU) of the electronic apparatus may be used to run each of the applications 'A, B, and C'.

Resource use information of the electronic apparatus may be identified by 'estimator' at preset time intervals or in real time. Such a process may be consistently repeated. Through this, resource use information corresponding to previous executions for each application may be accumulated.

The electronic apparatus may determine resource allocation information suitable for each application based on the resource use information.

(b) of FIG. 16 illustrates an example of resource allocation information determined based on resource use information. Referring to (b) of FIG. 16, it can be verified from the resource use information that a CPU is intensively used to run an application 'A', a GPU is intensively used to run an application 'B', and an application 'C' does not have a intensively used resource.

In such case, the resource allocation information may be determined by increasing a CPU usage rate to be greater than or equal to a predetermined value (e.g., 70%) in running of the application 'A'. The resource allocation information may be determined by increasing a GPU usage rate to be greater than or equal to a predetermined value (e.g., 60%) in running of the application 'B'. A resource allocation for running the application 'C' may be evenly (or equally) performed without concentration.

Figure 17:
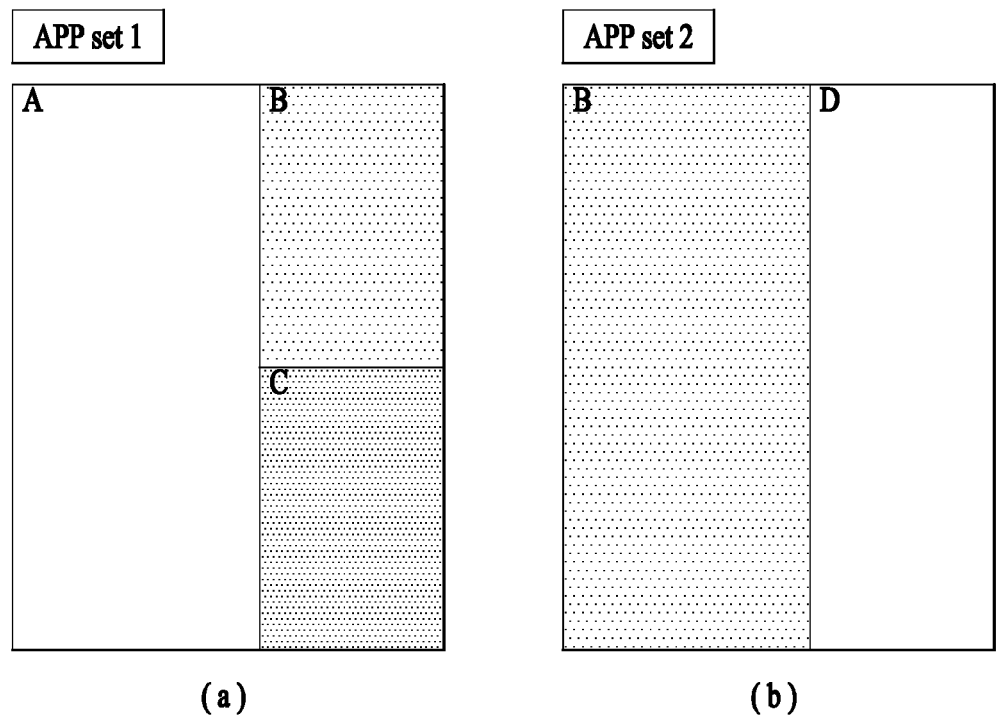
FIG. 17 illustrates examples of setting resource allocation information for each application group of an electronic apparatus according to an example embodiment of the present disclosure.

FIG. 17 illustrates examples of setting resource allocation information for each application group of an electronic apparatus according to an example embodiment of the present disclosure.

Referring to (a) and (b) of FIG. 17, execution information of different applications may be included in different application groups (e.g., APP set 1, APP set 2). Here, the execution information may include information on at least one of an application on execution, an area in which content associated with an application is displayed, and resource allocation information for each application.

For example, APP set 1 may be a group including three applications displayed as shown in (a) of FIG. 17. APP set 2 may be a group including two applications displayed as shown in (b) of FIG. 17.

When a predetermined application group (e.g., APP set 1 and APP set 2) is selected based on a user input, applications corresponding to the selected application group may be executed and content associated with the applications may be displayed based on a designated split screen.

In the example embodiment, the application group may be generated through a selection of a user. In this case, applications that are frequently used by the user and an arrangement of the applications may be applied to the group, so that the user uses the electronic apparatus with increased convenience.

According to example embodiments, it is possible to provide an electronic apparatus and a control method of the apparatus to run a plurality of applications based on different resource allocation information for each of the plurality of applications such that the plurality of applications is run more efficiently.

Effects are not limited to the aforementioned effects, and other effects not mentioned will be clearly understood by those skilled in the art from the description of the claims.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. An electronic apparatus comprising:
   a display; and
   a controller configured to:
      cause content corresponding to a first application to display in a first area of the display;
      cause content corresponding to a second application to display in a second area of the display;
      identify resource allocation information, the identified resource allocation information including first resource allocation information associated with the first application and second resource allocation information associated with the second application,
      wherein the resource allocation information comprises first resource allocation information associated with the first area and second resource allocation information associated with the second area; and
      execute the first application based on the first resource allocation information identified for the first application and associated with the first area, or execute the second application based on the second resource allocation information identified for the second application and associated with the second area.

2. The electronic apparatus of claim 1, wherein the controller is further configured to adjust resources allocated to the second application when an input corresponding to the first application is identified.

3. The electronic apparatus of claim 1, wherein the resource allocation information includes resource allocation information associated with a first category corresponding to the first application and a second category corresponding to the second application, and
   wherein the controller is further configured to identify the first resource allocation information associated with the first application and the second resource allocation information associated with the second application based on the first category corresponding to the first application and the second category corresponding to the second application, respectively.

4. The electronic apparatus of claim 1, wherein the resource allocation information is determined based on resource use information based on previous execution of the first application and the second application.

5. The electronic apparatus of claim 1, wherein the controller is further configured to:
   cause displaying content corresponding to a third application on a third area of the display;
   reduce resources allocated to the third application in response to an input being received and corresponding to at least one of the first application or the second application; and
   allocate resources to at least one of the first application or the second application based on the reduced resources allocated to the third application.

6. The electronic apparatus of claim 1, further comprising:
   a battery,
   wherein the controller is further configured to:
      identify a remaining capacity of the battery; and
      change at least one of the first resource allocation information or the second resource allocation information when the identified remaining capacity is less than or equal to a predetermined value.

7. The electronic apparatus of claim 1, wherein the resource allocation information includes information about at least one of a part in which a central processing unit (CPU) for each application is used, a usage rate of the CPU, a use time of the CPU, a usage rate of a graphics processing unit (GPU), a use time of the GPU, a frame per second (FPS), a resolution, a display brightness, or a loudness.

8. A method for controlling an electronic apparatus, the method comprising:
   displaying content corresponding to a first application in a first area of a display;
   displaying content corresponding to a second application in a second area of the display;
   identifying resource allocation information, the identified resource allocation information including first resource allocation information associated with the first application and second resource allocation information associated with the second application,
   wherein the resource allocation information comprises first resource allocation information associated with the first area and second resource allocation information associated with the second area; and
   executing the first application based on the first resource allocation information identified for the first application and associated with the first area, or executing the second application based on the second resource allocation information identified for the second application and associated with the second area.

9. The method of claim 8, further comprising:
   adjusting resources allocated to the second application when an input corresponding to the first application is identified.

10. The method of claim 8, wherein the resource allocation information includes resource allocation information associated with a first category corresponding to the first application and a second category corresponding to the second application, and
    wherein the executing the first application and the second application comprises:
       identifying the first resource allocation information associated with the first application and the second resource allocation information associated with the second application based on the first category corresponding to the first application and the second category corresponding to the second application, respectively.

11. The method of claim 8, wherein the resource allocation information is determined based on resource use information based on previous execution of the first application and the second application.

12. The method of claim 8, further comprising:
    identifying a remaining capacity of a battery of the electronic apparatus; and changing at least one of the first resource allocation information associated with the first application and the second resource allocation information associated with the second application when the identified remaining capacity is less than or equal to a predetermined value.

13. The method of claim 8, wherein the resource allocation information includes information about at least one of a part in which a central processing unit (CPU) for each application is used, a usage rate of the CPU, a use time of the CPU, a usage rate of a graphics processing unit (GPU), a use time of the GPU, a frame per second (FPS), a resolution, a display brightness, or a loudness.

* * * * *